Dec. 3, 1957     W. N. COOLIDGE     2,815,258
UTILITIES METER STRUCTURE
Filed Aug. 22, 1952
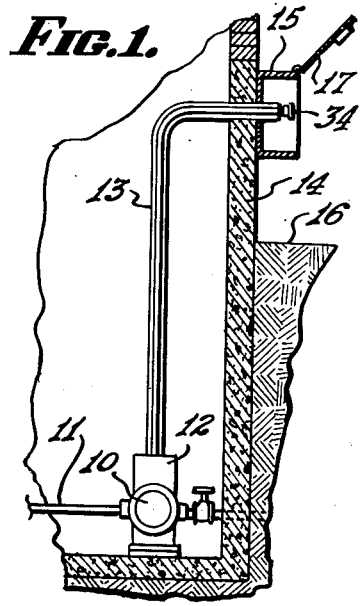
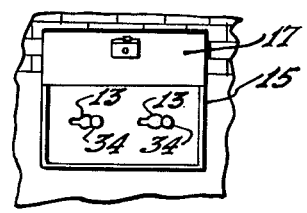
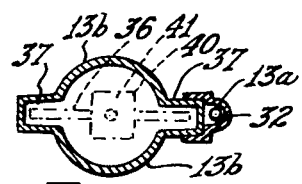
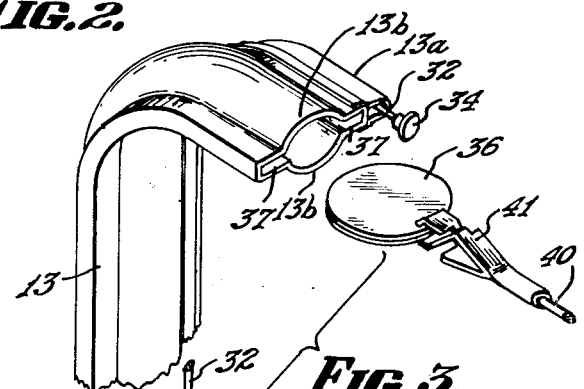
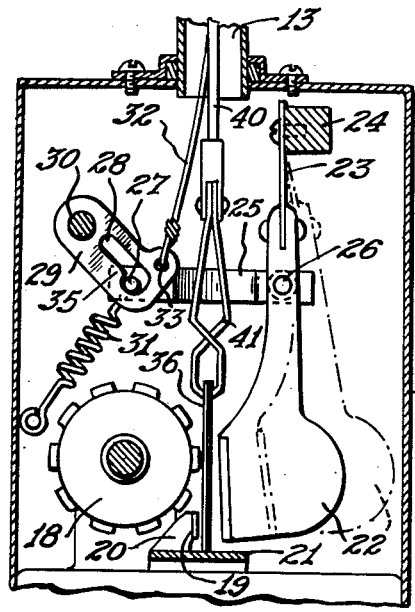
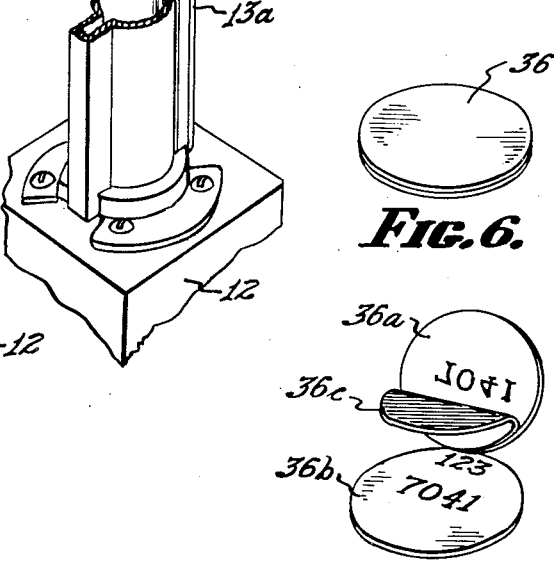
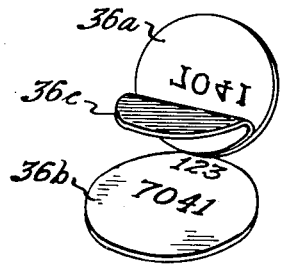
INVENTOR.
WILLIAM N. COOLIDGE,
BY
ATTORNEYS.

United States Patent Office 2,815,258
Patented Dec. 3, 1957

2,815,258

UTILITIES METER STRUCTURE

William N. Coolidge, Cincinnati, Ohio

Application August 22, 1952, Serial No. 305,829

6 Claims. (Cl. 346—95)

This invention relates to a utilities meter structure, and more particularly to a structure making it possible to read a water meter, gas meter, or an electric meter from a point remote from the meter, and preferably from a point outside the building in which the meter is located.

The reading of meters is one of the greatest problems confronting the utilities companies today. Meters are usually installed in the basements of homes, and meter readers go from house to house to read the meters. At each residence the reader must gain admission from the occupants of the house, he must then usually go down to a dark or poorly lighted basement to read the meter, and the reader is often bothered by the absence of the occupants from the home, or by the attacks of dogs. Repeat trips in cases of absence of the occupants consume a great deal of time and cut down the number of readings which the reader may turn in per day.

With these considerations in mind it is the principal object of my invention to provide for a meter structure whereby the reader can obtain a reading without entering the building in which the meter is disposed. It is another object of my invention to provide a structure as outlined which may be installed in new homes, and which with a slight modification of the meters could be installed in existing residences. It is still another object of the invention to obtain a printed reading whereby the human element is left out of consideration so that errors in reading of meters are avoided.

These and other objects of the invention, which will be pointed out in greater detail hereinafter, or which will be apparent to one skilled in the art upon reading these specifications, I accomplish by that certain construction and arrangement of parts, of which I shall now disclose an exemplary embodiment.

Reference is made to the drawings forming a part hereof, and in which:

Figure 1 is a fragmentary cross sectional view through the basement of a home showing my device installed;

Figure 2 is a fragmentary elevational view of the exterior portion of the device;

Figure 3 is a perspective view of the tube structure showing in exploded fashion how the reading element is inserted;

Figure 4 is a cross sectional view through the tube;

Figure 5 is a cross sectional view through the upper portion of the meter housing showing the printing mechanism;

Figure 6 is a perspective view of an element for printing; and

Figure 7 is a perspective view showing the element opened up.

Briefly, in the practice of the invention I provide a meter in which the reading is shown on a series of printing type wheels instead of on dials as is conventional. Some meters are at present provided with numeral wheels to indicate the reading, and in such case the only modification would be to substitute printing type wheels for the numeral wheels. A printing hammer is arranged in opposition to the printing type wheels so that upon actuation of the printing hammer with an element to be printed inserted therebetween, a record may be made on the element. Preferably, I also provide a printing block carrying indicia identifying the particular meter so that an identifying symbol for the meter will be printed along with the reading.

I connect this portion of the meter housing with the exterior of the building by means of a tube through which an element to be printed may be passed to the printing mechanism and through which it may be withdrawn from the printing mechanism. I provide a flexible member having a holding means for gripping the printing element, and I provide means on the exterior of the building for manually actuating the printing hammer.

Referring now to the drawings for a more detailed description of the device, a meter has been indicated generally at 10 to meter a flow of gas or water passing through the conduit 11. It will of course be understood that the same mechanism may be used in connection with an electrical meter, in which case there would be of course be wiring rather than a conduit 11. The upper portion of the meter housing indicated at 12 is connected to the outside of the building by means of a tube indicated generally at 13, which passes out through the building wall 14 to a receptacle or box 15 disposed on the exterior of the building. The receptacle 15 is mounted above ground level which is indicated at 16, and is preferably provided with a cover or lid 17, which desirably will have means for locking the same with a key thereto in the possession of the reader.

As seen in Figure 5, which is a cross sectional view through the portion 12 of the housing, one of a number of printing wheels is indicated at 18. These printing wheels 18 will be actuated from the meter mechanism in any conventional or desirable manner. A fixed printing block 19 will be provided carrying indicia identifying the particular meter by number or other suitable symbol. The printing block 19 may be mounted upon a bracket 20 secured to a frame member 21 of the meter. A printing hammer is indicated at 22, this hammer is secured by means of a link spring 23 to a fixed bar 24 extending across the housing 12. A link 25 is pivoted to the hammer 22 as at 26 and carries adjacent its other end a pin 27. The pin 27 engages in an L-shaped slot 28 of a link 29 which is pivoted to the casing as at 30 and is spring urged in a clockwise direction by means of the spring 31. A flexible wire or cable 32 is secured to the link 29 as at 33 and extends upward through the tube 13 to the outside and terminates in a handle member 34.

It will be clear from the foregoing description that when it is desired to actuate the hammer 22, the handle member 34 is pulled outwardly causing the link 29 to be pulled against the tension of the spring 31 in a counterclockwise direction. This movement results in a toggle action with the pin 27 and link 25 and pin 26 thrusting the hammer 22 toward the dotted line position shown in Figure 5. This movement continues until the axes of the links 29 and 25 pass a straight line connecting the points 26 and 30, whereupon the pin 27 will ride over the bump 35 of the J-shaped slot 28, whereupon the hammer 22 will snap back to its original position by virtue of the spring 23 and will strike a blow against the type face exposed on the printing wheels 18 and on the printing block 19 so that a record is made on an element inserted between the printing wheels 18 and printing block 19 and the hammer 22.

The element to be printed is shown in Figure 6 and indicated generally at 36, it may consist of a sandwich comprising two sheets of relatively thin cardboard or the like with a piece of carbon paper or the like therebetween. In Figure 7 one of the card laminae is indicated at 36a and the other at 36b and the carbon paper is indicated at 36c. There is thus provided a duplicate printed record with the indicia identifying the particular meter as well as the reading of that meter being printed on both the elements 36a and 36b. These elements are then turned in by the reader and handled in any of the usual accounting procedures.

In order to insure that the member 36 is presented flatwise between the printing wheels 18 and the hammer 22, the tube 13 which may be of thin sheet metal or plastic or any other suitable material is shaped to provide a relatively thin slot 37 which will accommodate the member 36 as to its width and thickness, and which will guide the member 36 down the tube into a position to be printed. Guide fingers will preferably be provided between the end of the tube 13 and the printing position to make sure that the element 36 is remained in oriented position, such guide elements have not been shown in Figure 5 in order not to further complicate the drawings, they may simply consist of wire fingers.

As most clearly shown in Figure 3 the tube 13 may have an extension along one edge as indicated at 13a and provided with a bore therethrough to accommodate the wire 32 for actuating the printing hammer.

In order to pass the element 36 through the tube to printing position and to withdraw it therefrom, I preferably provide a flexible element 40 which may be wire or the like, on one end of which a clip member 41 may be provided. The element 36 is grasped in the clip member 41 as best seen in Figures 3 and 5 and is inserted into the tube and pushed down until it bottoms, at that point the member 34 is actuated to cause the printing operation to take place and then the member 40 is withdrawn.

In order to accommodate the clip member 41 the tube is enlarged centrally as indicated at 13b so that the member 41 may readily pass down the tube, and the edges of the element 36 will be guided in the slot 37 and the member 36 will thus be kept in oriented position.

It may be desirable to provide a structure such as had been described for the water meter and the gas meter, or for perhaps the gas meter and the electric meter, or for all three. Thus, in Figure 2, I have shown the box 15 as providing two devices such as have been described whereby two different meters may be read. It will of course be understood that more may readily be provided as the situation demands.

It should be clearly understood that the specific details of the printing mechanism do not form a part of the present invention, the printing mechanism may be actuated electrically or in any other desired manner. The showing of Figure 5 illustrates a convenient way and an inexpensive way in which the hammer may be actuated, but except where specifically claimed the printing actuation mechanism is intended to be claimed broadly.

Numerous modifications may be made without departing from the spirit of the invention and I therefore do not intend to limit myself otherwise than as set forth in the claims which follow.

Having now fully described my invention what I claim as new and desire to secure by Letters Patent is:

1. In combination with a utilities meter, a number of type wheels for indicating the reading of said meter, a snap action linkage actuated printing hammer opposed to said type wheels, and an abutment for an element to be printed, said type wheels, printing hammer and abutment defining a printing position for such element, a tube extending from said meter to a remote point, means at said remote point for actuating said printing hammer, said means comprising a pull wire passing along said tube and terminating at said remote point in a manually engageable member and means for passing an element to be printed through said tube from said remote point to said printing position, and for withdrawing said element to said remote point.

2. In combination with a utilities meter disposed within a building, a number of type wheels for indicating the reading of said meter, a printing hammer opposed to said type wheels, and an abutment for the element to be printed, said type wheels, printing hammer and abutment defining a printing position for such element, a tube extending from said meter to a point outside said building, means at said outside point for actuating said printing hammer, and means for passing an element to be printed through said tube from said outside point to said printing position, and for withdrawing said element to said outside point.

3. The combination of claim 2 wherein said means for passing an element through said tube comprises a flexible member of a length greater than said tube, and having at one end means for holding said element.

4. The combination of claim 2 wherein said element is flat, and said tube has a cross-sectional shape to accept said element and to permit its passage in an oriented position.

5. The combination of claim 2, wherein said element is flat, and said tube has a cross-sectional shape to accept said element and to permit its passage in an oriented position, and wherein said means for passing said element through said tube comprises a flexible member of a length greater than said tube, and having at one end means for holding said element, the cross-section of said tube being enlarged in part to permit passage of said holding means.

6. The combination of claim 1, wherein said tube is provided with a conduit for said pull wire.

References Cited in the file of this patent

UNITED STATES PATENTS

| | | |
|---|---|---|
| 782,996 | Swigart | Feb. 21, 1905 |
| 946,755 | Golden | Jan. 18, 1910 |
| 1,138,985 | Shotwell | May 11, 1915 |
| 1,331,627 | Dilts | Feb. 24, 1920 |
| 2,094,711 | Leininger | Oct. 5, 1937 |
| 2,138,480 | Wild | Nov. 29, 1938 |
| 2,524,299 | Sutherland | Oct. 3, 1950 |